United States Patent
Hirsch et al.

(10) Patent No.: US 8,025,836 B2
(45) Date of Patent: *Sep. 27, 2011

(54) METHOD AND PLANT FOR THE HEAT TREATMENT OF SOLIDS CONTAINING IRON OXIDE

(75) Inventors: Martin Hirsch, Friedrichsdorf (DE); Michael Stroeder, Neu-Anspach (DE); Peter Weber, Espoo (FI)

(73) Assignee: Outotec Oyi, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 12/610,821

(22) Filed: Nov. 2, 2009

(65) Prior Publication Data

US 2010/0044933 A1 Feb. 25, 2010

Related U.S. Application Data

(62) Division of application No. 10/540,434, filed as application No. PCT/EP03/14106 on Dec. 12, 2003, now Pat. No. 7,632,334.

(30) Foreign Application Priority Data

Dec. 23, 2002 (DE) .................................. 102 60 731

(51) Int. Cl.
F27B 15/02 (2006.01)
(52) U.S. Cl. ........................................ 266/172; 422/139
(58) Field of Classification Search .................. 75/366, 75/444, 450, 452, 453, 454, 455, 456, 457; 148/630; 266/172; 422/139, 143, 145, 147; 423/74, 148; 432/58, 197, 215
See application file for complete search history.

(56) References Cited

U.S. PATENT DOCUMENTS

| | | | |
|---|---|---|---|
| 2,485,317 A | 10/1949 | Roetheli | |
| 2,582,170 A | 1/1952 | Shen | |
| 2,582,710 A | 1/1952 | Martin | |
| 2,607,666 A | 8/1952 | Martin | |
| 2,714,126 A | 7/1955 | Keith | |
| 2,826,460 A | 3/1958 | Cameron et al. | |
| 2,864,674 A | 12/1958 | King | |

(Continued)

FOREIGN PATENT DOCUMENTS

AU 9894057 A1 5/2000

(Continued)

OTHER PUBLICATIONS

Eurasian Patent Office, Office Action for Application No. 200501030/27 dated Jun. 22, 2006.

(Continued)

*Primary Examiner* — Roy King
*Assistant Examiner* — Mark L Shevin
(74) *Attorney, Agent, or Firm* — Leydig, Voit & Mayer, Ltd.

(57) ABSTRACT

A plant for the heat treatment of solids containing iron oxide includes a fluidized bed reactor. The reactor includes at least one gas supply tube at least partly surrounded by an annular chamber in which a stationary annular fluidized bed is located, and a mixing chamber being located above the upper orifice region of the at least one gas supply tube. The gas flowing through the at least one gas supply tube entrains solids from the stationary annular fluidized bed-into the mixing chamber when passing through the upper orifice region of the at least one gas supply tube.

9 Claims, 2 Drawing Sheets

U.S. PATENT DOCUMENTS

| | | | |
|---|---|---|---|
| 2,874,095 A | 2/1959 | Boisture et al. | |
| 2,901,421 A | 8/1959 | Bourguet et al. | |
| 3,528,179 A | 9/1970 | Smith | |
| 3,565,408 A | 2/1971 | Reh et al. | |
| 3,578,798 A * | 5/1971 | Lapple et al. | 432/58 |
| 3,671,424 A | 6/1972 | Saxton | |
| 3,876,392 A | 4/1975 | Kalina et al. | |
| 3,884,620 A | 5/1975 | Rammler | |
| 3,995,987 A | 12/1976 | MacAskill | |
| 4,044,094 A | 8/1977 | Barner et al. | |
| 4,073,642 A | 2/1978 | Collin et al. | |
| 4,080,437 A | 3/1978 | Reh et al. | |
| 4,091,085 A | 5/1978 | Reh et al. | |
| 4,191,544 A | 3/1980 | Boll et al. | |
| 4,338,283 A | 7/1982 | Sakamoto et al. | |
| 4,377,466 A | 3/1983 | Wallman | |
| 4,402,754 A | 9/1983 | Schmidt et al. | |
| 4,404,755 A | 9/1983 | Stewart et al. | |
| 4,490,287 A | 12/1984 | Hardwick et al. | |
| 4,545,132 A | 10/1985 | Li et al. | |
| 4,555,388 A | 11/1985 | Hundebol | |
| 4,676,824 A | 6/1987 | Daradimos et al. | |
| 4,716,856 A | 1/1988 | Beisswenger et al. | |
| 4,786,477 A | 11/1988 | Yoon et al. | |
| 4,789,580 A | 12/1988 | Hirsch et al. | |
| 4,795,547 A | 1/1989 | Barnes | |
| 4,806,158 A | 2/1989 | Hirsch et al. | |
| 4,817,563 A | 4/1989 | Beisswenger et al. | |
| 4,822,592 A | 4/1989 | Misra | |
| 4,919,715 A | 4/1990 | Smith et al. | |
| 4,992,245 A | 2/1991 | Van Slooten et al. | |
| 5,033,413 A | 7/1991 | Zenz et al. | |
| 5,205,350 A * | 4/1993 | Hirsch et al. | 165/104.18 |
| 5,269,236 A | 12/1993 | Okuno et al. | |
| 5,349,154 A | 9/1994 | Harker et al. | |
| 5,374,413 A | 12/1994 | Kim et al. | |
| 5,382,412 A | 1/1995 | Kim et al. | |
| 5,382,418 A | 1/1995 | Thone et al. | |
| 5,437,850 A | 8/1995 | Kroehl et al. | |
| 5,505,907 A * | 4/1996 | Hiltunen et al. | 422/146 |
| 5,560,762 A | 10/1996 | Bresser et al. | |
| 5,573,689 A | 11/1996 | Fukuoka et al. | |
| 5,603,748 A | 2/1997 | Hirsch et al. | |
| 5,783,158 A | 7/1998 | Tacke et al. | |
| 5,942,110 A | 8/1999 | Norris | |
| 6,007,869 A | 12/1999 | Schreieder et al. | |
| 6,015,539 A | 1/2000 | Schmidt et al. | |
| 6,022,513 A | 2/2000 | Pecoraro et al. | |
| 6,074,533 A | 6/2000 | Tranquilla | |
| 6,110,413 A | 8/2000 | Jung et al. | |
| 6,197,234 B1 | 3/2001 | Goudmand et al. | |
| 6,368,389 B1 * | 4/2002 | Birke et al. | 95/275 |
| 6,395,248 B1 | 5/2002 | Kim et al. | |
| 6,413,477 B1 | 7/2002 | Govoni et al. | |
| 6,416,721 B1 | 7/2002 | Sanjurjo et al. | |
| 6,827,786 B2 | 12/2004 | Lord | |
| 6,830,597 B1 | 12/2004 | Green | |
| 7,526,923 B2 | 5/2009 | Lothe | |
| 7,625,422 B2 | 12/2009 | Orth et al. | |
| 7,632,334 B2 | 12/2009 | Hirsch et al. | |
| 7,662,351 B2 | 2/2010 | Hirsch et al. | |
| 7,803,268 B2 | 9/2010 | Orth et al. | |
| 2006/0162500 A1 | 7/2006 | Nuber et al. | |
| 2006/0230879 A1 | 10/2006 | Stroder et al. | |
| 2006/0230880 A1 | 10/2006 | Hirsch et al. | |
| 2006/0231433 A1 | 10/2006 | Rufo, Jr. et al. | |
| 2006/0231466 A1 | 10/2006 | Nuber | |
| 2006/0249100 A1 | 11/2006 | Freytag et al. | |
| 2006/0263292 A1 | 11/2006 | Hirsch et al. | |
| 2006/0278566 A1 | 12/2006 | Orth et al. | |
| 2007/0137435 A1 | 6/2007 | Orth et al. | |

FOREIGN PATENT DOCUMENTS

| | | |
|---|---|---|
| CN | 1732276 A | 2/2006 |
| CN | 1738918 A | 2/2006 |
| DE | 1 016 938 | 10/1957 |
| DE | 2805906 | 8/1979 |
| DE | 3235559 | 5/1984 |
| DE | 2524541 | 8/1986 |
| DE | 2624302 | 4/1987 |
| DE | 248 109 | 7/1987 |
| DE | 3822999 | 1/1990 |
| DE | 278 348 | 5/1990 |
| DE | 40 15031 | 11/1991 |
| DE | 41 03 965 | 4/1992 |
| DE | 4206602 | 6/1993 |
| DE | 4410093 C1 | 3/1995 |
| DE | 196 09284 | 9/1997 |
| DE | 19841513 | 5/1999 |
| DE | 198 13 286 A1 | 9/1999 |
| DE | 694 16458 | 9/1999 |
| DE | 694 17103 | 9/1999 |
| DE | 1010157 | 7/2002 |
| DE | 10061386 | 9/2002 |
| DE | 10164086 | 8/2003 |
| EP | 0630975 A1 | 12/1984 |
| EP | 0 246 191 | 11/1987 |
| EP | 0534243 | 3/1993 |
| EP | 0 575 245 | 12/1993 |
| EP | 0630 683 | 12/1994 |
| EP | 0748391 | 12/1996 |
| EP | 0995065 | 4/2000 |
| GB | 915412 | 1/1963 |
| GB | 915412 | 3/1964 |
| GB | 951245 | 3/1964 |
| GB | 1 502 576 | 3/1978 |
| WO | 89/09290 | 10/1989 |
| WO | WO 90/11824 | 10/1990 |
| WO | 98/08989 | 3/1998 |
| WO | 01/44719 | 6/2001 |
| WO | 02/055744 | 7/2002 |
| WO | WO-2004056465 | 7/2004 |
| WO | WO-2004056467 | 7/2004 |

OTHER PUBLICATIONS

Vijay, "Preoxidation and Hydrogen Reduction of Ilmenite in a Fluidized Bed Reactor" XP 000632260, *Metallurgical and Materials Transactions B*, vol. 27B, Oct. 1996 pp. 731-738.

* cited by examiner

METHOD AND PLANT FOR THE HEAT TREATMENT OF SOLIDS CONTAINING IRON OXIDE

CROSS REFERENCE TO PRIOR APPLICATIONS

This application is a divisional of application Ser. No. 10/540,434, filed May 16, 2006, now U.S. Pat. No. 7,632,334, which is a U.S. National Phase application under 35 U.S.C. §371 of International Application No. PCT/EP2003/014106, filed on Dec. 12, 2003 and which claims benefit to German Patent Application No. 102 60 731.1, filed on Dec. 23, 2002. The International Application was published in English on Jul. 8, 2004 as WO 2004/057044 under PCT Article 21(2).

FIELD

The present invention relates to a method for the in particular reductive heat treatment of solids containing iron oxide, in which fine-grained solids are heated to a temperature of about 630° C. in a fluidized-bed reactor, and to a corresponding plant.

BACKGROUND

Such method and a plant are known for instance from DE 44 10 093 C1, in order to reduce iron-oxide-containing solids such as iron ores, iron ore concentrates or the like. For this purpose, iron-oxide-containing ore is introduced into the fluidized-bed reactor and fluidized with heated reduction gas. The solids are entrained by the gas stream and separated from the exhaust gas in a downstream separator, in order to be recirculated to the reactor. For further processing, solids are withdrawn from the lower region of the reactor.

However, this direct reduction in the fluidized-bed reactor involves the risk that above the distributor grid (gas distributor), which is typically used for distributing the reduction gas, excess temperatures are obtained, as the reduction gas has a high temperature for heating the solids. At the same time, the mass and heat transfer conditions are regarded as unsatisfactory due to the only limited solids retention time of e.g. 20 minutes and the only moderate relative velocities between gas and solids. Due to the additional introduction of exhaust gases of a downstream reduction stage into the reactor, the reactor must have a complicated design, for instance with a diameter reduced by about 30% in the vicinity of the exhaust gas inlet. In addition, the gas supply conduits are gated at an angle, in order to prevent a clogging of the conduit to which dust-laden (secondary) gas is admitted, and to allow that solids which have entered the conduit fall back into the reactor.

SUMMARY

Therefore, it is an aspect of the present invention to improve the conditions for a mass and heat transfer during the heat treatment of solids containing iron oxide.

In an embodiment, the present invention a plant for the heat treatment of solids containing iron oxide includes a fluidized bed reactor. The reactor includes at least one gas supply tube at least partly surrounded by an annular chamber in which a stationary annular fluidized bed is located, and a mixing chamber being located above the upper orifice region of the at least one gas supply tube. The gas flowing through the at least one gas supply tube entrains solids from the stationary annular fluidized bed into the mixing chamber when passing through the upper orifice region of the at least one gas supply tube.

DETAILED DESCRIPTION

Figure 1:
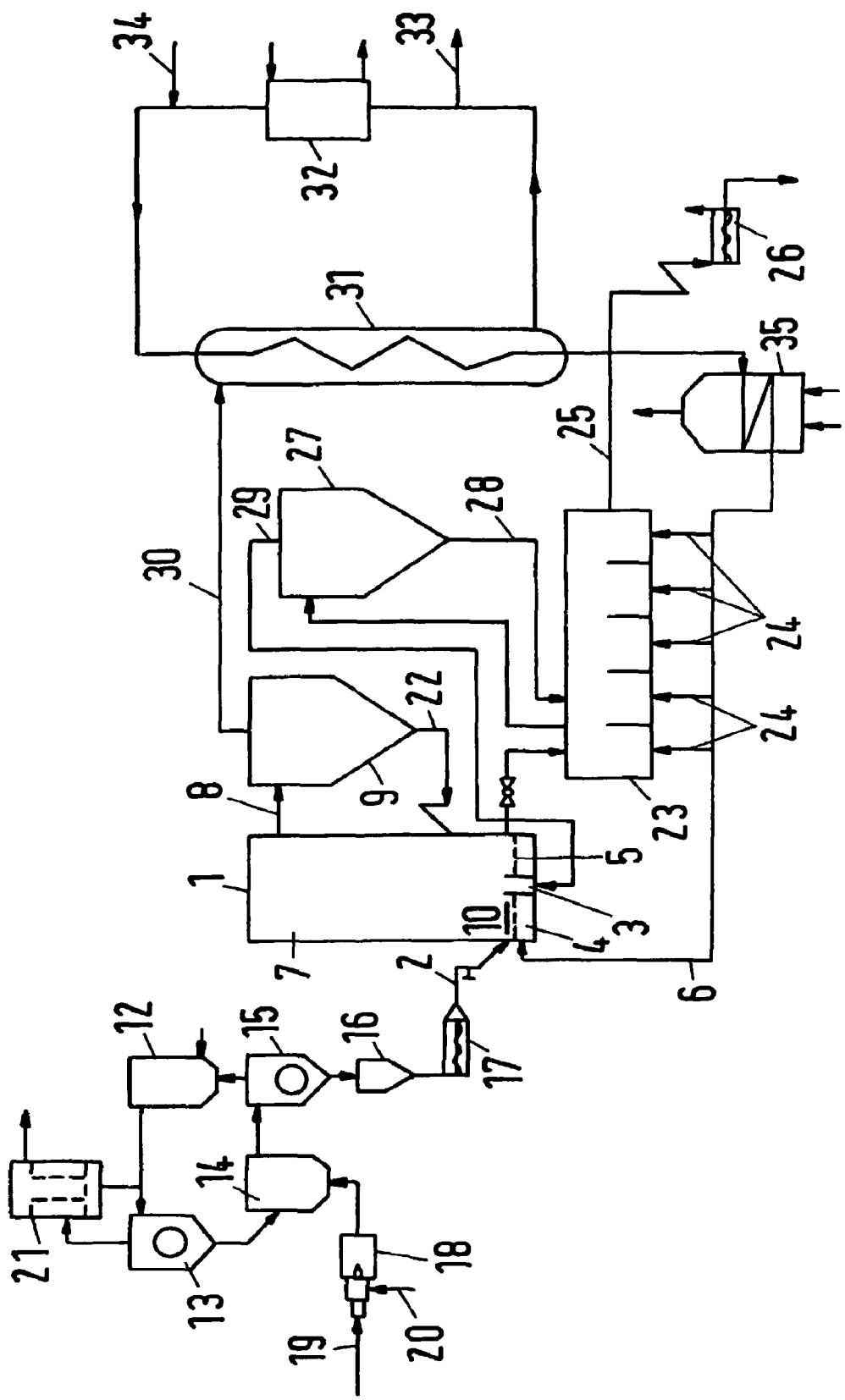
FIG. 1 shows a process diagram of a method and a plant in accordance with an embodiment of the present invention.

In the method of the invention, the advantages of a stationary fluidized bed, such as a sufficiently long solids retention time, and the advantages of a circulating fluidized bed, such as a good mass and heat transfer, can surprisingly be combined with each other during the heat treatment, while the disadvantages of both systems are avoided. When passing through the upper region of the central tube, the first gas or gas mixture entrains solids from the annular stationary fluidized bed, which is referred to as annular fluidized bed, into the mixing chamber, so that due to the high slip velocities between the solids and the first gas an intensively mixed suspension is formed and an optimum mass and heat transfer between the two phases is achieved. By correspondingly adjusting the bed height in the annular fluidized bed as well as the gas velocities of the first gas or gas mixture and of the fluidizing gas, the solids loading of the suspension above the orifice region of the central tube can be varied within wide ranges, so that the pressure loss of the first gas between the orifice region of the central tube and the upper outlet of the mixing chamber can be between 1 mbar and 100 mbar. In the case of a high solids loading of the suspension in the mixing chamber, a large part of the solids will separate out of the suspension and fall back into the annular fluidized bed. This recirculation is called internal solids recirculation, the stream of solids circulating in this internal circulation normally being significantly larger than the amount of solids supplied to the reactor from outside. The (smaller) amount of not precipitated solids is discharged from the mixing chamber together with the first gas or gas mixture. The retention time of the solids in the reactor can be varied within a wide range by the selection of height and cross-sectional area of the annular fluidized bed and be adapted to the desired heat treatment. Due to the high solids loading on the one hand and the good mass and heat transfer on the other hand, the formation of local temperature peaks in the mixing chamber can be avoided. The amount of solids entrained from the reactor with the gas stream is completely or at least partly recirculated to the reactor, with the recirculation expediently being fed into the stationary fluidized bed. The stream of solid matter thus recirculated to the annular fluidized bed normally lies in the same order of magnitude as the stream of solid matter supplied to the reactor from outside. Apart from the excellent utilization of the reduction gas, another advantage of the method in accordance with the invention consists in the possibility of quickly, easily and reliably adjusting the utilization of the reduction gas and the mass transfer to the requirements by changing the flow velocities of the first gas or gas mixture and of the fluidizing gas. Furthermore, the construction of the reactor can be simplified such that the same for instance has a cylindrical shape.

To ensure a particularly effective heat transfer in the mixing chamber and a sufficient retention time in the reactor, the gas velocities of the first gas mixture and of the fluidizing gas are preferably adjusted for the fluidized bed such that the dimensionless Particle-Froude-Numbers ($Fr_P$) in the central tube are 1.15 to 20, in particular about 10.6, in the annular fluidized bed 0.115 to 1.15, in particular about 0.28, and/or in the mixing chamber 0.37 to 3.7, in particular about 1.1. The Particle-Froude-Numbers are each defined by the following equation:

$$Fr_P = \frac{u}{\sqrt{\frac{(\rho_s - \rho_f)}{\rho_f} * d_p * g}}$$

with
u=effective velocity of the gas flow in m/s
$\rho_s$=density of a solid particle in kg/m³
$\rho_f$=effective density of the fluidizing gas in kg/m³
$d_P$=mean diameter in m of the particles of the reactor inventory (or the particles formed) during operation of the reactor
g=gravitational constant in m/s².

When using this equation it should be considered that $d_P$ does not indicate the mean diameter ($d_{50}$) of the material used, but the mean diameter of the reactor inventory formed during the operation of the reactor, which can differ significantly from the mean diameter of the material used (primary particles). Even from very fine-grained material with a mean diameter of e.g. 3 to 10 µm, particles (secondary particles) with a mean diameter of 20 to 30 µm can be formed for instance during the heat treatment. On the other hand, some materials, e.g. ores, are decrepitated during the heat treatment.

In accordance with a development of the invention it is proposed to adjust the bed height of solids in the reactor such that the annular fluidized bed at least partly extends beyond the upper orifice end of the central tube by a few centimeters, and thus solids are constantly introduced into the first gas or gas mixture and entrained by the gas stream to the mixing chamber located above the orifice region of the central tube. In this way, there is achieved a particularly high solids loading of the suspension above the orifice region of the central tube, which improves the transfer conditions between gas and solids.

By means of the method in accordance with the invention all kinds of iron-oxide-containing ores, in particular iron ores or iron ore concentrates, can effectively be heat-treated.

The generation of the amount of heat necessary for the operation of the reactor can be effected in any way known to the expert for this purpose.

In accordance with a particular embodiment of the invention it is provided to supply preheated reduction gas to the reactor for fluidization, which reduces the possibly likewise preheated solids. The reactor temperature for instance lies below the temperature of the mass flows entering the reactor. As reduction gas, gas with a hydrogen content of at least 80%, preferably above 90%, is particularly useful.

The consumption of fresh reduction gas can be decreased considerably when the reduction gas is cleaned in a reprocessing stage downstream of the reactor and subsequently recirculated to the reactor. During reprocessing, the gas is first separated from solids, possibly passed through a scrubber and cooled below the dew point of steam, so that the steam content can be reduced, then compressed and enriched with fresh hydrogen.

In accordance with a development of the invention it is proposed to cover part of the energy demand of the reactor by supplying exhaust gases from a downstream reactor, for instance another reduction reactor, which possibly still contains reduction gas. Thus, the necessary demand of fresh reduction gas and fuel can be decreased distinctly. Preferably, the exhaust gas is supplied to the reactor via the central tube, while processed reduction gas is expediently introduced as fluidizing gas into the annular fluidized bed through a conduit.

A plant in accordance with the invention, which is in particular suited for performing the method described above, has a reactor constituting a fluidized-bed reactor for the in particular reductive heat treatment of solids containing iron oxide, the reactor having a gas supply system which is formed such that gas flowing through the gas supply system entrains solids from a stationary annular fluidized bed, which at least partly surrounds the gas supply system, into the mixing chamber. Preferably, this gas supply system extends into the mixing chamber. It is, however, also possible to let the gas supply system end below the surface of the annular fluidized bed. The gas is then introduced into the annular fluidized bed e.g. via lateral apertures, entraining solids from the annular fluidized bed into the mixing chamber due to its flow velocity.

In accordance with a preferred aspect of the invention, the gas supply system has a central tube extending upwards substantially vertically from the lower region of the reactor into the mixing chamber of the reactor, which central tube is at least partly surrounded by a chamber in which the stationary annular fluidized bed is formed. The annular fluidized bed need not be circular, but rather other shapes of the annular fluidized bed are also possible in dependence on the geometry of the central tube and of the reactor, as long as the central tube is at least partly surrounded by the annular fluidized bed. Of course, two or more central tubes with different or the same dimensions can also be provided in the reactor. Preferably, however, at least one of the central tubes is arranged approximately centrally, based on the cross-sectional area of the reactor.

In accordance with another embodiment of the present invention, the central tube has apertures, for instance in the form of slots, at its shell surface, so that during the operation of the reactor solids constantly get into the central tube through the apertures and are entrained by the first gas or gas mixture from the central tube into the mixing chamber.

In accordance with a preferred embodiment, a separator, for instance a cyclone for separating solids is provided downstream of the reactor, the separator having a solids conduit which leads to the annular fluidized bed of the first reactor.

To provide for a reliable fluidization of the solids and the formation of a stationary fluidized bed, a gas distributor is provided in the annular chamber of the reactor, which divides the chamber into an upper fluidized bed region and a lower gas distributor chamber. The gas distributor chamber is connected with a supply conduit for fluidizing gas. Instead of the gas distributor chamber, there can also be used a gas distributor composed of tubes.

The energy demand of the plant can be reduced in that the reactor has a supply conduit for hydrogen-containing reduction gas, which leads to the central tube and is connected for instance with the exhaust gas outlet of a separator of another reactor provided downstream of the reactor. Alternatively or in addition, a supply conduit for preheated hydrogen-containing reduction gas, which extends in or leads to the annular chamber, may be provided in the plant in accordance with the invention.

To not exceed the technically manageable maximum temperatures of the gases used in the plant, the energy required for the heat treatment should preferably not exclusively be introduced into the reactor via the gases. For this purpose, a preheating stage for the solids may be provided upstream of the reactor, so that already preheated solids are introduced into the reactor. Preferably, the temperature of the solids charged into the reactor lies above the reactor temperature.

In the annular fluidized bed and/or the mixing chamber of the reactor, means for deflecting the solid and/or fluid flows may be provided in accordance with the invention. It is for instance possible to position an annular weir, whose diameter lies between that of the central tube and that of the reactor wall, in the annular fluidized bed such that the upper edge of the weir protrudes beyond the solids level obtained during operation, whereas the lower edge of the weir is arranged at a distance from the gas distributor or the like. Thus, solids separated out of the mixing chamber in the vicinity of the reactor wall must first pass by the weir at the lower edge thereof, before they can be entrained by the gas flow of the central tube back into the mixing chamber. In this way, an exchange of solids is enforced in the annular fluidized bed, so that a more uniform retention time of the solids in the annular fluidized bed is obtained.

The invention will subsequently be described in detail with reference to an embodiment and the drawing. All features described and/or illustrated in the drawing form the subject-matter of the invention per se or in any combination, independent of their inclusion in the claims or their back-reference.

Figure 2:
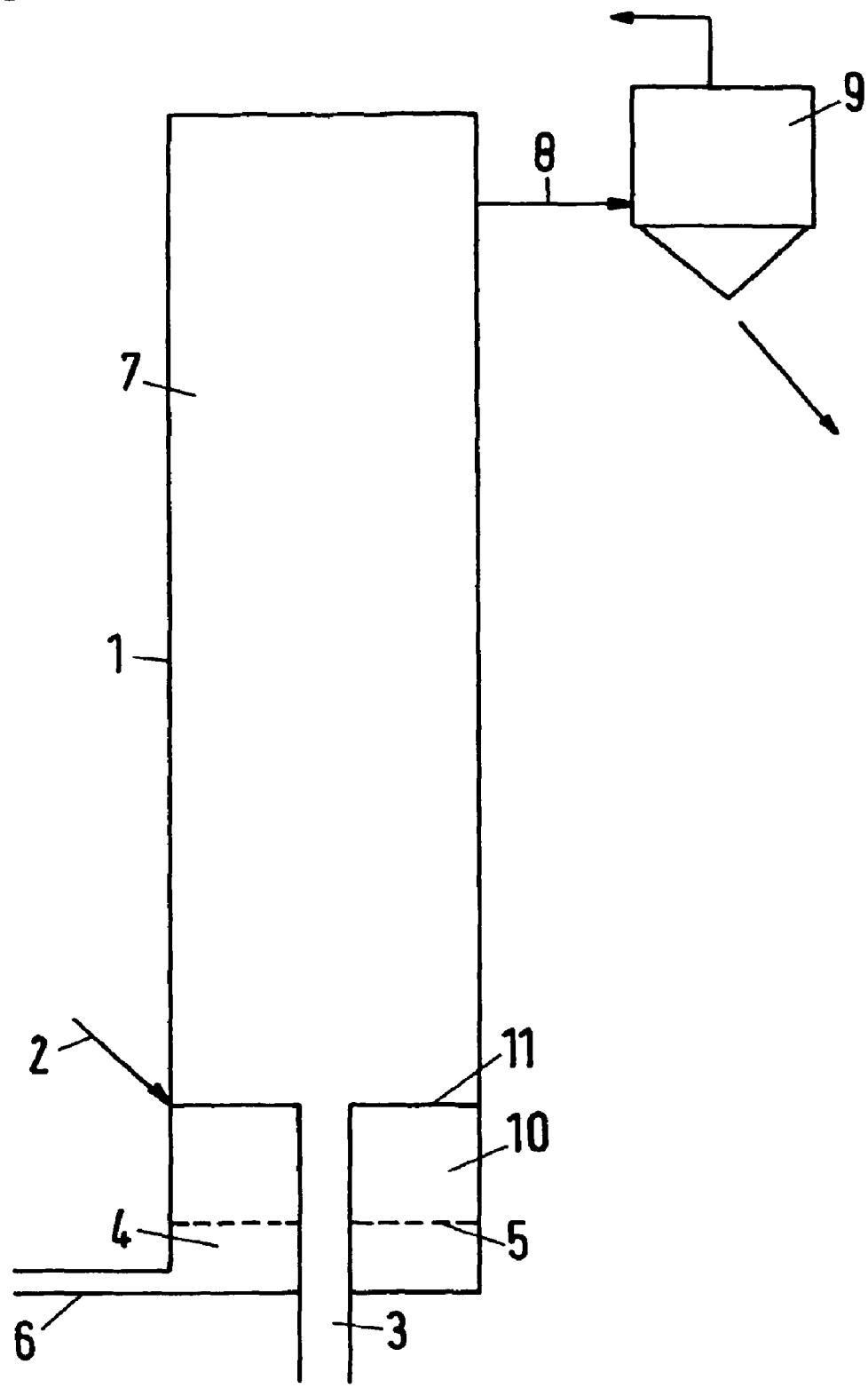
FIG. 2 shows an enlarged detail of FIG. 1.

In the method shown in FIG. 1, which is in particular suited for the heat treatment of solids containing iron oxide, solids are introduced into a reactor 1 via a supply conduit 2, as can be seen in the enlarged representation of FIG. 2. The for instance cylindrical reactor 1 has a central tube 3 arranged approximately coaxially with the longitudinal axis of the reactor, which central tube extends substantially vertically upwards from the bottom of the reactor 1.

In the vicinity of the bottom of the reactor 1, an annular gas distributor chamber 4 is provided, which at its upper end is terminated by a gas distributor 5 having through openings. A supply conduit 6 opens into the gas distributor chamber 4.

In the vertically upper region of the reactor 1, which forms a mixing chamber 7, a discharge conduit 8 is arranged, which opens into a separator 9 constituting a cyclone.

When solids are now introduced into the reactor 1 via the supply conduit 2, a layer annularly surrounding the central tube 3 is formed on the gas distributor 5, which layer is referred to as annular fluidized bed 10. Fluidizing gas introduced into the gas distributor chamber 4 through the supply conduit 6 flows through the gas distributor 5 and fluidizes the annular fluidized bed 10, so that a stationary fluidized bed is formed. The velocity of the gases supplied to the reactor 1 via the gas distributor chamber 4 is adjusted such that the Particle-Froude-Number in the annular fluidized bed 10 is about 0.28.

Due to the supply of more solids into the annular fluidized bed 10, the solids level 11 in the reactor 1 rises to such an extent that solids get into the orifice of the central tube 3. Through the central tube 3, a gas or gas mixture is at the same time introduced into the reactor 1. The velocity of the gas supplied to the reactor 1 preferably is adjusted such that the Particle-Froude-Number in the central tube 3 is about 10.6 and in the mixing chamber 7 about 1.1. Due to these high gas velocities, the gas flowing through the central tube 3 entrains solids from the stationary annular fluidized bed 10 into the mixing chamber 7 when passing through the upper orifice region.

Since the level 11 of the annular fluidized bed 10 is raised above the upper edge of the central tube 3, solids flow over this edge into the central tube 3, whereby an intensively mixed suspension is formed. The upper edge of the central tube 3 can be straight, wavy or serrated, or the shell surface can have lateral inlet openings. As a result of the reduction of the flow velocity due to the expansion of the gas jet and/or by impingement on one of the reactor walls, the entrained solids quickly lose velocity and partly fall back into the annular fluidized bed 10. The amount of non-precipitated solids is discharged from the reactor 1 together with the gas stream via conduit 8. Between the reactor regions of the stationary annular fluidized bed 10 and the mixing chamber 7 a solids circulation is obtained, by means of which a good heat transfer is ensured. Before the further processing, the solids discharged via conduit 8 are separated from the gases or gas mixtures in the cyclone 9.

In accordance with the method shown in FIG. 1, the fine-grained solids such as iron ore are first charged into a preheating stage with a Venturi preheater 12. Downstream of the same a cyclone 13 is provided, in which the solids are separated from exhaust gas. From the cyclone 13, the solids are supplied to another Venturi preheater 14. Downstream of the same, a cyclone 15 is in turn provided, in which the solids are separated from exhaust gas and via a bunker 16 and a screw conveyor 17 are supplied to the reactor 1 via conduit 2.

Hot combustion gases from a combustion chamber 18 are supplied to the Venturi preheater 14 for heating the solids, to which combustion chamber fuel is supplied via conduit 10 and combustion air is supplied via conduit 20. It turned out to be advantageous to operate the combustion at a pressure of 0.8 to 10 bar and preferably at atmospheric pressure. The still hot exhaust gases which were separated from the solids in the cyclone 15 are supplied to the first Venturi preheater 12 for preheating the solids. After the separation of the solids in the cyclone 13, the exhaust gas is cleaned in a filter 21.

In the reactor 1, the solids are subjected to a heat treatment, with heated reducing fluidizing gas being introduced through conduit 6 into the annular fluidized bed 10 formed. At the same time, exhaust gas from another reduction stage downstream of the reactor 1 is supplied through the central tube 3, so that the solids for one part circulate in the reactor 1 in the manner described above and for the other part are discharged from the reactor 1 via conduit 8 and upon separation of the exhaust gas in the cyclone 9 are recirculated to the annular fluidized bed via conduit 22.

From the annular fluidized bed 10, a stream of solids is in addition withdrawn from the reactor 1 and supplied to a downstream fluidized bed reactor 23. The fluidized-bed reactor 23 has a classical fluidized bed, into which heated fluidizing gas is introduced via conduit 24. Via conduit 25, solids are withdrawn from the fluidized-bed reactor 23 and supplied for instance to a briquetting plant 26.

In a cyclone 27, the exhaust gases of the fluidized-bed reactor 23 are separated from solids, which are recirculated to the fluidized-bed reactor 23 via conduit 28. The exhaust gases are supplied from the cyclone 27 via conduit 29 to the central tube 3 of the reactor 1.

The exhaust gases of the reactor 1, which were separated from the solids in the cyclone 9, are supplied to a reprocessing via conduit 30. First of all, the exhaust gases are cooled in a heat exchanger 31 and introduced into a scrubber 32, where the cooled gas is further cooled below the dew point of steam, so that the steam content of the exhaust gas can largely be removed. Via conduit 33, a partial stream of the exhaust gas can be removed from the circuit, to prevent for instance an accumulation of nitrogen in the circulating gas. In the same way, fresh reducing gas can be admixed via conduit 34 for fortification. The cleaned gas is now preheated in the heat exchanger 31 and supplied to a heater 35. The cleaned hot reduction gas is then supplied to the fluidized-bed reactor 23 via conduit 24 and as fluidizing gas via conduit 6 to the reactor 1.

In the following, the invention will be explained by means of an example demonstrating the invention, but not restricting the same.

EXAMPLE

Reduction of Iron-Oxide-Containing Iron Ore

In a plant corresponding to FIG. 1, 61.2 t/h moist ore with 7.8% moisture were supplied to the Venturi preheater 12. Into the combustion chamber 18, 1500 Nm$^3$/h natural gas were at the same time introduced via conduit 19 and 21.000 Nm$^3$/h air via conduit 20. By means of the combustion gases from the combustion chamber 18, the moist ores were preheated to 500° C. in the two Venturi preheaters 12 and 14. In the filter 21, 2.6 t/h dust were separated from the exhaust gas of the preheating stage.

To the reactor 1, 54.2 t/h preheated ore were supplied via the screw conveyor 17 and conduit 2, and reducing fluidizing gas containing
  91 vol-% $H_2$,
  0.6 vol-% $H_2O$ and
  8.4 vol-% $N_2$
was supplied via conduit 6. The reduction temperature in the reactor 1, which had a diameter of 3 m, was about 630° C. The pressure at the outlet of the reactor 1 was 4 bar.

From the reactor 1, 40.6 t/h prereduced material with a degree of metallization of 70% were introduced into the fluidized-bed reactor 23. The same had a length of 12 m and a width of 4 m. To the fluidized-bed reactor 23, preheated reducing fluidizing gas containing
  91 vol-% $H_2$,
  0.6 vol-% $H_2O$ and
  8.4 vol-% $N_2$
was supplied via conduit 24.

From the fluidized-bed reactor 23, 36.8 t/h product with a degree of metallization of 92% were introduced via conduit 25 into the briquetting plant 26 and briquetted therein. The product had a carbon content of 0.05 wt-%.

Via conduit 30, 182,000 Nm$^3$/h exhaust gas containing
  79 vol-% $H_2$,
  12 vol-% $H_2O$, and
  9 vol-% $N_2$
were introduced into the heat exchanger 31 and cooled therein to 120° C. In the scrubber 32, the exhaust gas was further cooled to 28° C. Upon admixture of 23,000 Nm$^3$/h fresh gas with a $H_2$ content of 97% via conduit 34, the gas was heated to 520° C. in the heat exchanger 31. After a further heating in the heater 35, 70% of the gas were introduced into the fluidized-bed reactor 23, and the remaining 30% of the gas were introduced into the reactor 1.

The present invention is not limited to embodiments described herein; reference should be had to the appended claims.

LIST OF REFERENCE NUMERALS 1. reactor
2. supply conduit
3. central tube
4. gas distributor chamber
5. gas distributor
6. supply conduit
7. mixing chamber
8. conduit
9. separator
10. annular fluidized bed
11. level of the annular fluidized bed
12. Venturi preheater
13. cyclone
14. Venturi preheater
15. cyclone
16. bunker
17. screw conveyor
18. combustion chamber
19. conduit
20. conduit
21. filter
22. solids return conduit
23. fluidized-bed reactor
24. conduit
25. conduit
26. briquetting plant
27. cyclone
28. solids return conduit
29. conduit
30. conduit
31. heat exchanger
32. scrubber
33. conduit
34. conduit
35. heater

The invention claimed is:

1. A plant for the heat treatment of solids containing in oxide, the plant comprising:
  a fluidized bed reactor, wherein the reactor comprises at least one gas supply tube at least partly surrounded by an annular chamber in which a stationary annular fluidized bed is located; and
  a mixing chamber located above an upper orifice region of the at least one gas supply tube such that gas flowing through the at least one gas supply tube entrains solids from the stationary annular fluidized bed into the mixing chamber when passing through the upper orifice region of the at least one gas supply tube; and
  a preheating stage including a combustion chamber and a preheater for the solids disposed upstream of the reactor.

2. The plant as claimed in claim 1, wherein the at least one gas supply tube extends upwards substantially vertically from a lower region of the reactor into the mixing chamber of the reactor.

3. The plant as claimed in claim 1, wherein the at least one gas supply tube is arranged approximately centrally with respect to a cross-sectional area of the reactor.

4. The plant as claimed in claim 1, wherein the at least one gas supply tube includes a shell surface having openings.

5. The plant as claimed in claim 1, further comprising a cyclone for separating solids downstream of the reactor, wherein the cyclone has a solids conduit leading to the annular fluidized bed of the reactor.

6. The plant as claimed in claim 1, further comprising a gas distributor in the annular chamber of the reactor, which divides the chamber into an upper fluidized bed region and a lower gas distributor chamber, wherein the lower gas distributor chamber is connected with a supply conduit for fluidizing gas.

7. The plant as claimed in claim 1, wherein the reactor has a supply conduit for hydrogen-containing reduction gas, which leads to the at least one gas supply tube and is connected with the exhaust gas outlet of a separator of a second reactor downstream of the reactor.

8. The plant as claimed in claim 1, wherein the reactor has a supply conduit for preheated hydrogen-containing reduction gas which leads to the annular chamber.

9. A plant for the heat treatment of solids containing iron oxide, the plant comprising:
- a first reactor, wherein the first reactor comprises at least one gas supply tube at least partly surrounded by an annular chamber in which a stationary annular fluidized bed is located;
- a mixing chamber located above an upper orifice region of the at least one gas supply tube such that gas flowing through the at least one gas supply tube entrains solids from the stationary annular fluidized bed into the mixing chamber when passing through the upper orifice region of the at least one gas supply tube; and
- a second reactor disposed downstream of the first reactor, the second reactor including a solids separator and a supply conduit configured to provide exhaust gas from the solids separator into the fluidized bed of the first reactor.

* * * * *